US009854615B2

(12) United States Patent
Akhtar Masoom Akhtar (10) Patent No.: US 9,854,615 B2
(45) Date of Patent: Dec. 26, 2017

(54) DEVICES AND METHODS FOR TELEPHONE CALL SHARING USING A DIRECT WIRELESS CONNECTION

(71) Applicant: Sony Corporation, Tokyo (JP)

(72) Inventor: Javed Akhtar Masoom Akhtar, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 130 days.

(21) Appl. No.: 14/414,636

(22) PCT Filed: Jan. 15, 2014

(86) PCT No.: PCT/JP2014/000167
§ 371 (c)(1),
(2) Date: Jan. 13, 2015

(87) PCT Pub. No.: WO2015/107564
PCT Pub. Date: Jul. 23, 2015

(65) Prior Publication Data
US 2016/0278143 A1 Sep. 22, 2016

(51) Int. Cl.
*H04W 72/00* (2009.01)
*H04W 76/02* (2009.01)
(Continued)

(52) U.S. Cl.
CPC ....... *H04W 76/023* (2013.01); *H04M 1/7253* (2013.01); *H04M 3/562* (2013.01);
(Continued)

(58) Field of Classification Search
None
See application file for complete search history.

(56) References Cited

U.S. PATENT DOCUMENTS

2009/0011753 A1* 1/2009 Barnier ............... H04B 5/0062
455/422.1
2011/0021143 A1* 1/2011 Kapur ............... H04L 63/0464
455/41.2
(Continued)

FOREIGN PATENT DOCUMENTS

EP 1 829 303 B1 4/2010
EP 1829303 B1 * 4/2010 .......... H04B 5/0062
EP 2 574 018 A1 3/2013

OTHER PUBLICATIONS

International Search Report and Written Opinion of the International Search Authority for PCT/JP2014/000167 dated Oct. 7, 2014.

*Primary Examiner* — Andrew Lai
*Assistant Examiner* — Jamaal Henson
(74) *Attorney, Agent, or Firm* — Myers Bigel, P.A.

(57) ABSTRACT

A host electronic device is configured to share a telephone call with a participant electronic device. The host electronic device includes a transceiver, a wireless communication module and a controller. The controller is configured to: establish a direct wireless connection with the participant electronic device; process and present incoming call data received from an outside device through a speaker and/or a display device at the host electronic device; forward the incoming call data to the participant electronic device using the direct wireless connection for presentation of the incoming call data through a speaker and/or a display device at the participant device; receive participant call data from the participant electronic device using the direct wireless connection; process and present the received participant call data through a speaker and/or display device at the host electronic device; and forward the participant call data to the outside device.

22 Claims, 8 Drawing Sheets

(51) Int. Cl.
*H04M 1/725* (2006.01)
*H04M 3/56* (2006.01)
*H04W 4/00* (2009.01)
*H04W 84/12* (2009.01)

(52) U.S. Cl.
CPC ........... *H04W 4/008* (2013.01); *H04W 84/12* (2013.01); *H04M 2203/5018* (2013.01); *H04M 2207/18* (2013.01); *H04M 2250/04* (2013.01); *H04M 2250/62* (2013.01)

(56) References Cited

U.S. PATENT DOCUMENTS

| | | | |
|---|---|---|---|
| 2013/0136089 A1* | 5/2013 | Gillett | H04W 72/048 370/329 |
| 2013/0143529 A1* | 6/2013 | Leppanen | H04W 4/08 455/411 |
| 2013/0311694 A1* | 11/2013 | Bhamidipati | H04M 1/7253 710/303 |
| 2013/0322416 A1* | 12/2013 | Son | H04W 84/02 370/338 |
| 2014/0004846 A1* | 1/2014 | Dua | G06F 17/30058 455/422.1 |
| 2014/0087705 A1* | 3/2014 | Wooster | H04B 5/0031 455/416 |
| 2014/0171048 A1* | 6/2014 | Sanaullah | H04W 4/16 455/416 |
| 2014/0194059 A1* | 7/2014 | Milosevski | H04M 1/7253 455/41.1 |

* cited by examiner

DEVICES AND METHODS FOR TELEPHONE CALL SHARING USING A DIRECT WIRELESS CONNECTION

CROSS-REFERENCE TO RELATED APPLICATION

This application is a 35 U.S.C. §371 national stage application of PCT International Application No. PCT/JP2014/000167, filed on 15 Jan. 2014, the disclosure and content of which is incorporated by reference herein as if set forth in its entirety.

BACKGROUND

An individual typically has a primary electronic device (e.g., a smartphone) having a subscriber identity module (SIM) card or the like with an associated telephone number. The primary device is used to place and receive telephone calls. One or more additional electronic devices (e.g., a laptop and/or a tablet computer) may be connectable to the primary electronic device via Wi-Fi Direct, for example. It may be desirable in such instances to direct a telephone call from the primary device to an additional device such that the user of the additional device can join the conversation. Such a system may also allow a user to use multiple devices for one phone number without worrying about where the primary device is located.

SUMMARY

Some embodiments of the present invention are directed to a host electronic device configured to share a telephone call with a participant electronic device. The host electronic device includes a transceiver. The transceiver is configured to receive incoming call data of the telephone call from an outside device and to send outgoing call data of the telephone call to the outside device. The host electronic device includes a wireless communication module configured to communicate with the participant electronic device over a direct wireless interface. The host electronic device includes a controller configured to: establish a direct wireless connection with the participant electronic device; process and present the incoming call data through a speaker and/or a display device at the host electronic device; forward the incoming call data to the participant electronic device using the direct wireless connection for presentation of the incoming call data through a speaker and/or a display device at the participant device; receive participant call data from the participant electronic device using the direct wireless connection; process and present the received participant call data through a speaker and/or display device at the host electronic device; and forward the participant call data to the outside device. The controller may be configured to carry out one or more of these operations automatically.

In some embodiments, the controller is configured to substantially concurrently: (i) process and present the incoming call data through a speaker and/or a display device at the host electronic device; and (ii) forward the incoming call data to the participant electronic device using the direct wireless connection for presentation of the incoming call data through a speaker and/or a display device at the participant device. In some embodiments, the controller is configured to substantially concurrently: (i) process and present the participant call data at the host electronic device through a speaker and/or display device at the host device; and (ii) forward the participant call data to the outside device. In some embodiments, the participant call data is based on audio and/or video captured at the participant electronic device.

The host electronic device may include a microphone configured to capture audio at the host electronic device and/or a camera configured to capture video at the host electronic device. The controller may be configured to forward host call data to the participant electronic device using the direct wireless connection for presentation of the host call data through the speaker and/or the display device at the participant device. The host call data may be based on the audio and/or video captured at the host electronic device. The controller may be configured to substantially concurrently: (i) forward the host call data to the outside device; and (ii) forward the host call data to the participant electronic device using the direct wireless connection for presentation of the host call data through a speaker and/or a display device at the participant device.

In some embodiments, the wireless communication module is configured to establish a Wi-Fi Direct wireless connection with the participant electronic device as the direct wireless connection. The host electronic device may include a display device. In some embodiments, the electronic device is configured to operate in a discovery mode, and the controller is configured to: display a throw interface on the display device; display a list of available participant devices on the display device responsive to user actuation of the throw interface; and responsive to user input selecting one of the participant electronic devices, establish a Wi-Fi Direct wireless connection with the selected participant electronic device. The host electronic device may be configured to operate in a communication mode after the Wi-Fi Direct wireless connection with the selected participant electronic device is established.

The host electronic device may be configured to communicate with other electronic devices via near-field communication (NFC). The controller may be configured to establish a Wi-Fi Direct wireless connection with the participant electronic device using information exchanged when the host electronic device and the participant electronic device are touched or brought in proximity with one another.

Some other embodiments of the present invention are directed to a method using a host electronic device compliant with Wi-Fi Direct. The method includes: connecting a telephone call between the host electronic device and an outside device including receiving incoming call data from the outside device; establishing a Wi-Fi Direct wireless connection between the host electronic device and a participant electronic device that is in a Wi-Fi Direct network with the host electronic device; processing and presenting the incoming call data through a speaker and/or display device at the host electronic device; forwarding the incoming call data to the participant electronic device using the Wi-Fi Direct wireless connection for presentation of the incoming call data through a speaker and/or a display device at the participant device; receiving participant call data from the participant electronic device using the Wi-Fi Direct wireless connection; processing and presenting the participant call data at the host electronic device through a speaker and/or display device at the host electronic device; and forwarding the participant call data to the outside device. In some embodiments, one or more of these steps may be performed automatically.

The method may include forwarding the incoming call data to the participant electronic device using the Wi-Fi Direct wireless connection for presentation of the incoming call data through a speaker and/or a display device at the participant device that is substantially concurrent with the presentation of the incoming call data through a speaker and/or display device at the host electronic device. The method may include forwarding the participant call data to the outside device for presentation of the participant call data through a speaker and/or a display device of the outside device that is substantially concurrent with the presentation of the of the participant call data at the host electronic device through a speaker and/or display device at the host device.

The participant call data may be based on audio and/or video captured at the participant electronic device.

In some embodiments, the method includes: capturing audio and/or video at the host electronic device; and forwarding host call data to the participant electronic device using the Wi-Fi Direct wireless connection for presentation of the host call data through a speaker and/or a display device at the participant device, with the host call data being based on the audio and/or video captured at the host electronic device. The method may include forwarding the host call data to the outside device for presentation of the host call data through a speaker and/or a display device of the outside device that is substantially concurrent with the presentation of the host call data through a speaker and/or a display device at the participant device.

In some embodiments, prior to establishing a Wi-Fi Direct wireless connection, the method includes operating the host electronic device in a discovery mode, including: effecting a throw command at the host electronic device; displaying a list of available participant electronic devices in the Wi-Fi network on a display device of the host electronic device in response to the throw command; and selecting at least one of the displayed available participant devices. A Wi-Fi Direct wireless connection between the host electronic device and the at least one selected participant electronic device may be established. In some embodiments, the method includes: selecting a plurality of the displayed available participant electronic devices; establishing a Wi-Fi Direct wireless connection between the host electronic device and each of the plurality of selected participant electronic devices; forwarding the incoming call data to each of the plurality of selected participant electronic devices using the Wi-Fi Direct wireless connection for presentation of the incoming call data through a speaker and/or a display device at each of the plurality of selected participant devices; receiving participant call data from each of the plurality of selected participant electronic devices using the Wi-Fi Direct wireless connection; processing and presenting the participant call data from each of the plurality of selected participant electronic devices at the host electronic device through a speaker and/or display device at the host device; and forwarding the participant call data from each of the plurality of selected participant electronic devices to the outside device.

In some embodiments, prior to establishing a Wi-Fi Direct wireless connection, the method includes touching and/or bringing the host electronic device and the participant electronic device in proximity with one another to communicate using NFC and share information to establish the Wi-Fi Direct wireless connection.

Some other embodiments of the present invention are directed to a system including a host electronic device in a Wi-Fi Direct network and at least one participant electronic device in the Wi-Fi Direct network. The host device is configured to connect with an outside device for a telephone call, with the telephone call including incoming call data. The host electronic device is configured to: automatically process and present the incoming call data through a speaker and/or a display device; and substantially concurrently forward over a Wi-Fi Direct connection the incoming call data to the at least one participant electronic device. The at least one participant electronic device is configured to: automatically process and present the incoming call data received from the host electronic device through a speaker and/or a display device substantially concurrently with the presentation of the incoming call data through a speaker and/or display device at the host electronic device; and automatically forward participant call data to the host electronic device over the Wi-Fi Direct connection, with the participant call data being based on audio and/or video captured at the at least one participant electronic device In some embodiments, the at least one participant electronic device includes a controller and a display. The at least one participant electronic device may be configured to display an actuatable throw interface, and the at least one participant electronic device is configured to establish a Wi-Fi Direct connection with the host electronic device upon user actuation of the throw interface. The at least one participant electronic device may be configured to initiate or receive a telephone call to or from an outside device after establishing the Wi-Fi Direct connection with the host electronic device, with the host device serving as a proxy device for the telephone call. The host electronic device may be configured to emit an audible and/or visible alert upon actuation of the throw interface at the at least one participant electronic device.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a," "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" and "processor" may take the form of digital circuitry, such as computer-readable program code executed by an instruction processing device(s) (e.g., general purpose microprocessor and/or digital signal microprocessor), and/or analog circuitry. The operations that are described below with regard to the figures can therefore be at least partially implemented as computer-readable program code executed by a computer (e.g., microprocessor).

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

As used herein, the term "telephone call" means a communication session that includes transfer of audio, image and/or video data.

As used herein, the term "automatically" means that the operation so described can be carried out without user intervention (e.g., without the assistance and/or manual input of a human operator).

Some embodiments of the invention are directed to sharing telephone calls between electronic devices using Wi-Fi Direct. A Wi-Fi Direct network is a network system suggested by the Wi-Fi Alliance that enables Wi-Fi devices to be connected to each other in a peer-to-peer fashion without participating in a home network, an office network, or a hot-spot network.

Wi-Fi direct devices within a Wi-Fi Direct network may be directly connected to each other without using a wireless local area network (WLAN) access point. For such direct connections between Wi-Fi Direct devices, in some systems, one of the Wi-Fi Direct devices serves as the access point (sometimes referred to as the "Soft AP") and the other of the Wi-Fi direct devices serve as clients. Wi-Fi Direct has some similarities to Bluetooth in that they perform communication between devices, but Wi-Fi Direct has improved transmission range and a data transmission rate. Wi-Fi Direct facilitates IP-based communication between the devices.

Figure 1:
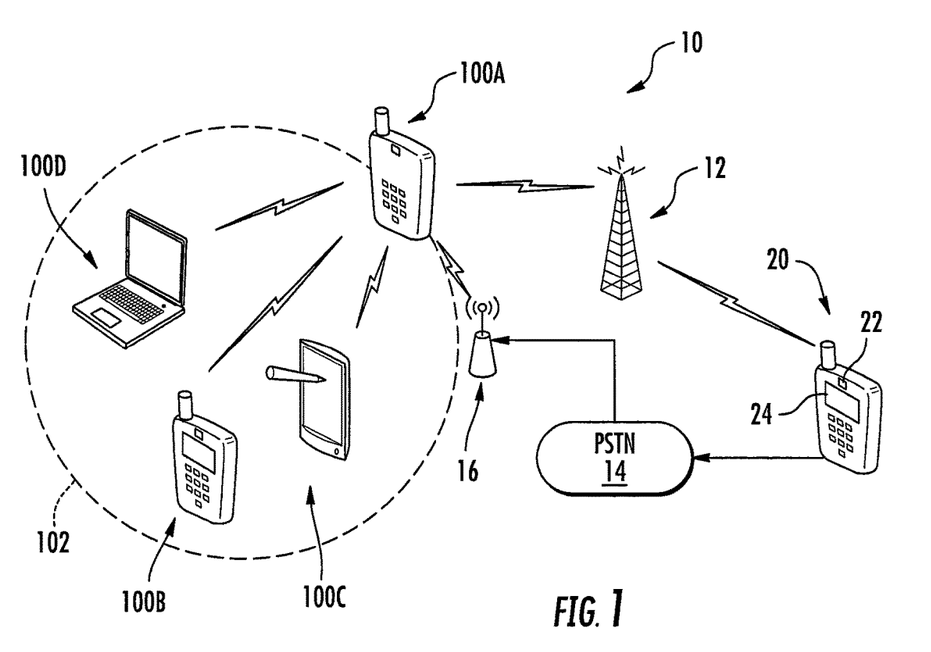
FIG. 1 is a schematic diagram illustrating a wireless communications system according to some embodiments.

FIG. 1 illustrates a wireless communications system 10 according to some embodiments. The system 10 includes one or more wireless network access nodes, here shown as a wireless base station 12. It will be appreciated that the base station 12 may include, for example, a conventional cellular network base station and/or access points or other devices that provide similar functionality in wide and/or local area wireless networks.

An outside device 20 (e.g., telephone or wireless communication terminal) and a host electronic device 100A (e.g., wireless communication terminal) are configured to communicate with the base station 12. The outside device 20 may include, inter alia, a speaker 22 and/or a display device 24. As further shown in dotted line, the host electronic device 100A may establish a peer-to-peer (P2P) network 102 (e.g., a Wi-Fi Direct network or a Bluetooth piconet). As illustrated, the P2P network 102 can include a plurality of participant devices 100B, 100C, 100D such as smartphones, laptop computers, personal computers, tablet computers and the like. The outside device 20 may be termed the "calling device or party" or the "called device or party" in various embodiments and is typically outside the P2P network 102. The outside device or telephone 20 may also communicate with the host device 100A via a public switched telephone network 14 and/or a network 16 (e.g., a network provided by a gateway or router).

Figure 2:
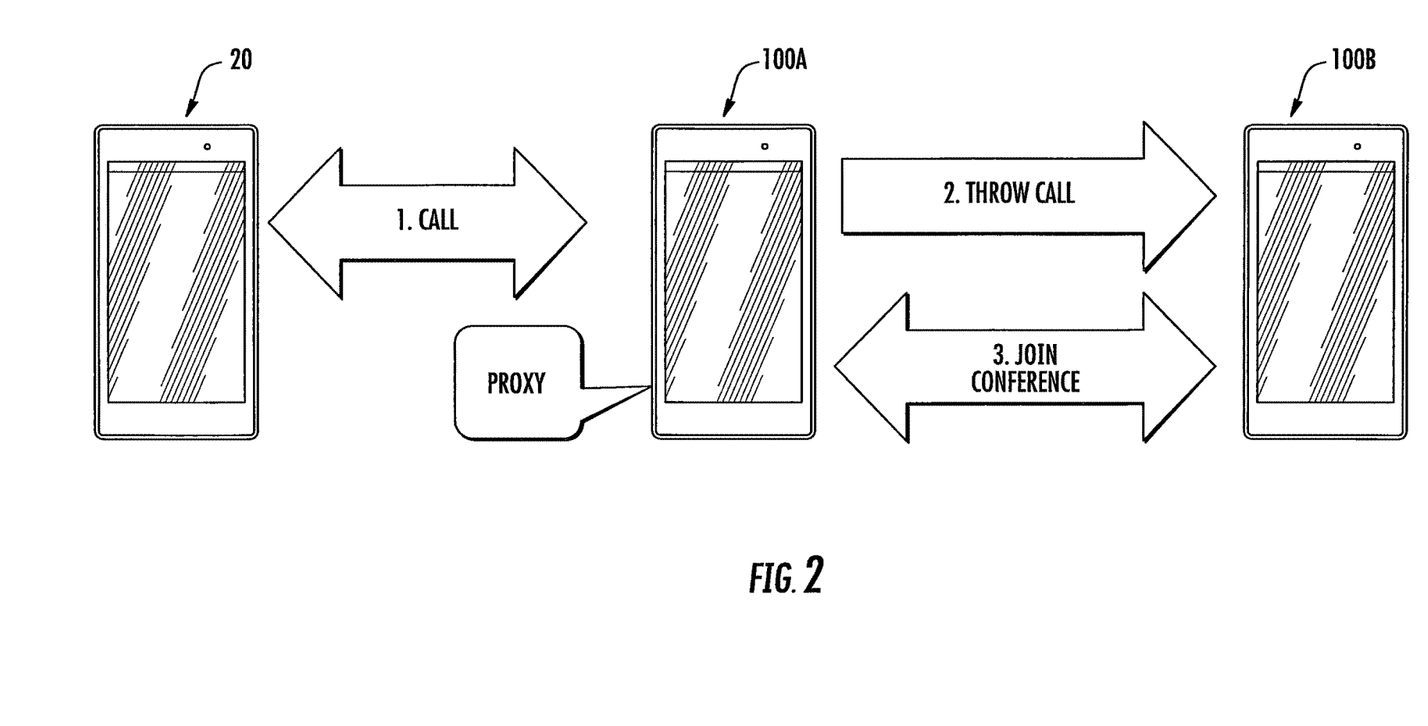
FIG. 2 is a block diagram illustrating methods and systems including an outside device, a host electronic device and a participant electronic device according to some embodiments.

FIG. 2 is a block diagram illustrating methods and systems for sharing a telephone call according to some embodiments. First, a telephone call is established between the outside device 20 and the host electronic device 100A. The outside device 20 may initiate the telephone call by calling the host electronic device 100A (i.e., the outside device 20 is the calling device) or the host electronic device 100A may initiate the call by calling the outside device 20 (i.e., the outside device 20 is the called device). Next, the host electronic device "throws" the call to the participant electronic device 100B (e.g., via a Wi-Fi Direct connection). The outside device 20, the host electronic device 100A and the participant electronic device 100B are now connected in a conference call. That is, the audio, speech or voice data (and, in some embodiments, video data) associated with the telephone call is directly wirelessly forwarded, transmitted or streamed from the host electronic device 100A to the participant electronic device 100B and audio, speech or voice data (and, in some embodiments, video data) captured at the participant electronic device 100B is directly wirelessly forwarded, transmitted or streamed from the participant electronic device 100B to the host electronic device 100A.

In this regard, the host electronic device 100A may serve as a proxy for the participant electronic device 100B to communicate on the conference call. The outside device 20 and the participant electronic device 100B are not directly connected and are also not connected via a traditional physical access point (e.g., a gateway or router). Instead, the host or proxy device 100A may serve as a "soft AP" to allow communication between the outside device 20 and the participant electronic device 100B (as well as the host electronic device 100A). In some embodiments, a data pipe is established between the host electronic device 100A and the participant electronic device 100B without affecting or interrupting the call or communication between the outside device 20 and the host electronic device 100A.

Figure 3A:
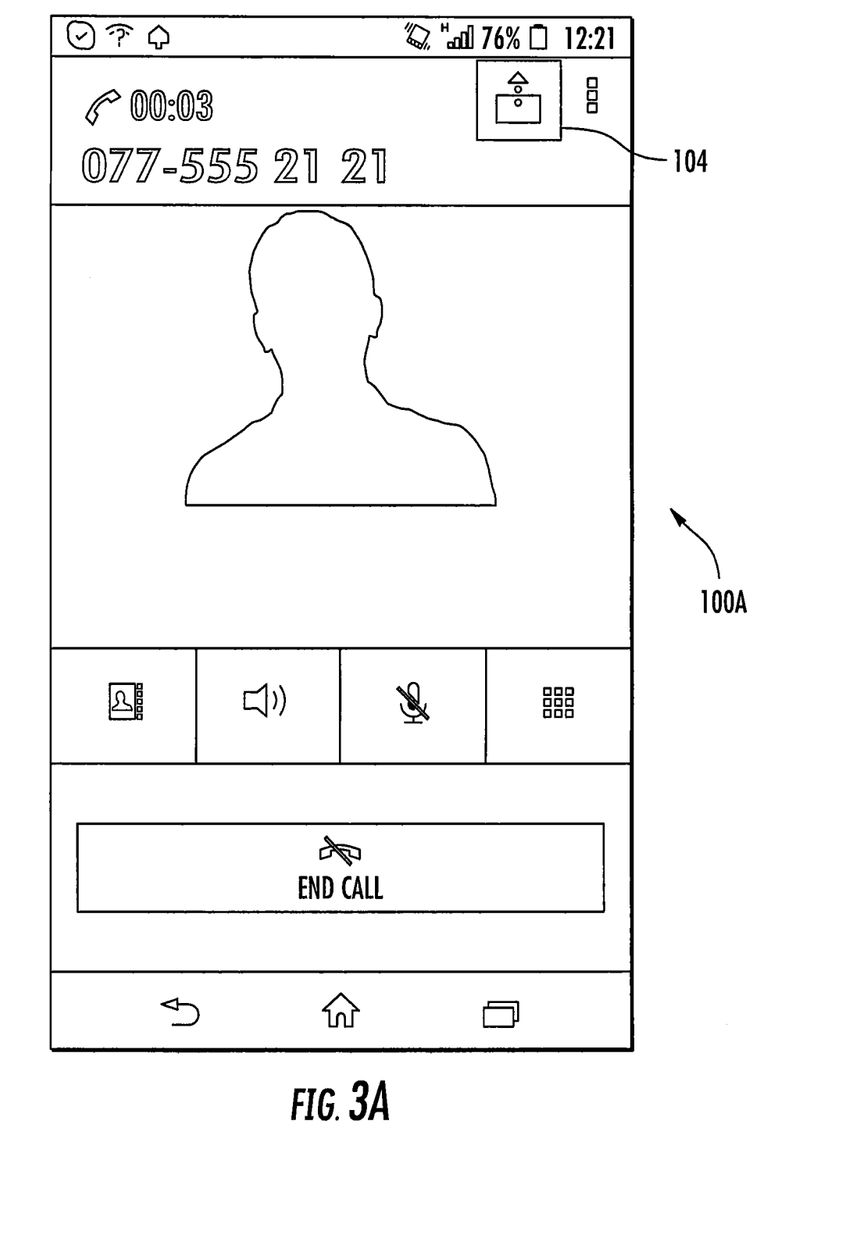
FIGS. 3A and 3B are screenshots of the host electronic device of FIG. 2.
Figure 3B:
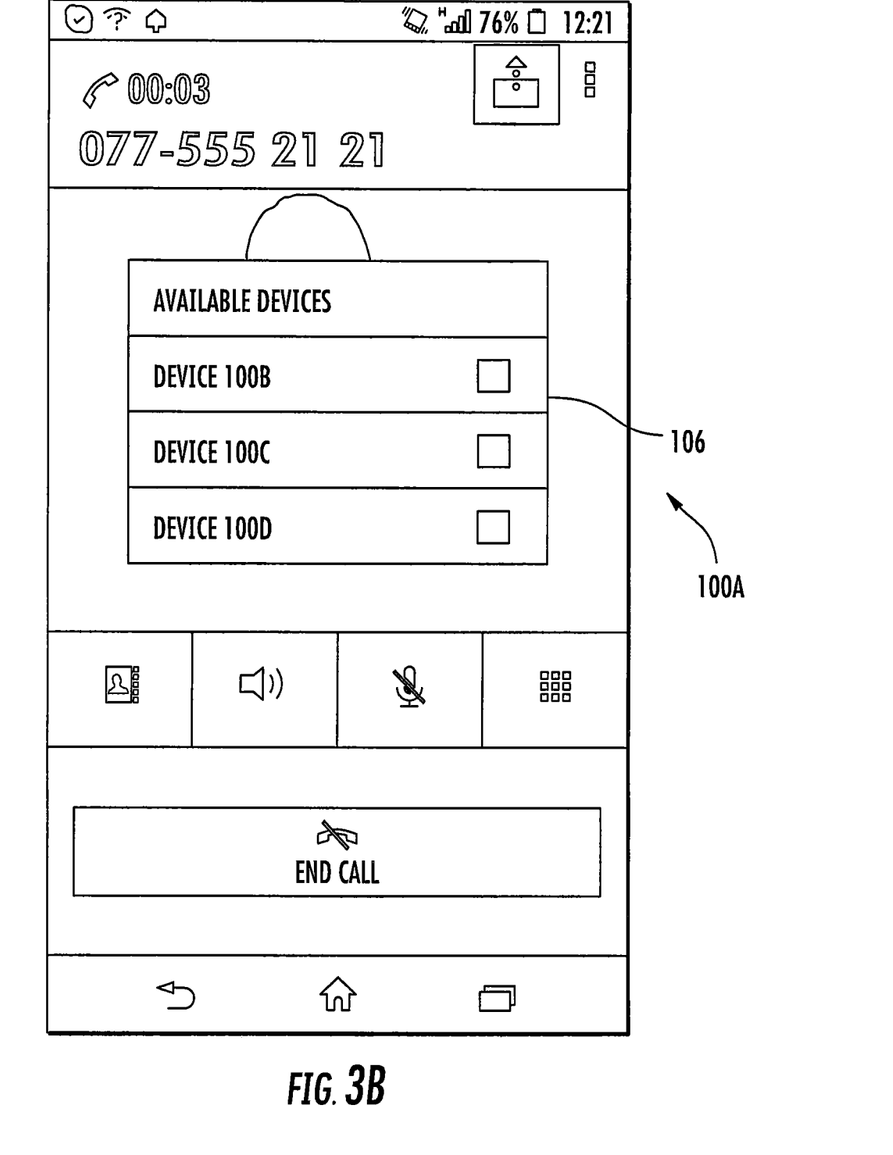

FIG. 3A illustrates a screenshot of the host electronic device 100A during a telephone call (that is, after calling or receiving a telephone call from the outside device 20). In the illustrated embodiment, a throw interface 104 (e.g., button) is provided and the user of the host electronic device 100A may actuate (e.g., press) the throw interface 104 to begin the process of establishing a direct wireless connection with one or more of the participant devices 100B, 100C, 100D. FIG. 3B illustrates a screenshot of the host electronic device 100A after the throw interface 104 has been pressed according to some embodiments. A list 106 (e.g., drop-down or pop-up menu) of available participant devices within the P2P network is displayed (e.g., automatically displayed). The user of the host electronic device 100A may select one or more of the participant devices 100B, 100C, 100D from the list to establish a direct wireless connection therewith.

In some embodiments, the host electronic device 100A may be operated in a discovery mode. For example, the host electronic device 100A may operate in a discovery mode after the throw button 104 is pressed. For example, the host electronic device 100A may automatically switch to a discovery mode after the throw button 104 is pressed. The host electronic device 100A may beacon and search for available participant electronic devices. Once a participant electronic device is selected and a direct wireless connection is established with the host electronic device 100A, the host electronic device 100A (and/or the connected participant device) may be operated in a conversation mode. For example, the host electronic device 100A (and/or the connected participant device) may automatically switch to a conversation mode after a direct wireless connection is established.

It will be understood that the direct wireless connection between the host electronic device 100A and the participant electronic devices 100B, 100C, 100D may be established in other ways. For example, in some embodiments, the host electronic device 100A and the participant electronic devices 100B, 100C, 100D may be Near-Field Communication (NFC) enabled devices. The host electronic device 100A and one of the participant electronic devices 100B, 100C, 100D may be brought in proximity to one another and/or touched to exchange information and to establish a direct wireless connection (e.g., a Wi-Fi Direct connection) therebetween. The devices may use NFC to negotiate the direct wireless connection and establish the direct wireless connection. The devices may automatically negotiate and establish the direct wireless connection upon bringing the devices in proximity with one another and/or touching the devices. The devices may be equipped with Sony Corporation One-Touch functionality, for example.

In some embodiments, the devices in the P2P network 102 may define a persistent group or network. In this way, the devices forming the group store network credentials to subsequently reinstate the P2P network. If one of the electronic devices 100A, 100B, 100C, 100D recognizes to have formed a persistent group with one or more of the other of the electronic devices 100A, 100B, 100C, 100D in the past, any two of the devices 100A, 100B, 100C, 100D can quickly automatically reinstate the group (e.g., using a two-way handshake).

Further exemplary procedures for establishing a direct connection in Wi-Fi Direct are described in U.S. Patent Application Publication Nos. 2012/0051244 and 2012/0252516, the disclosures of which are incorporated by reference herein in their entireties.

Figure 4:
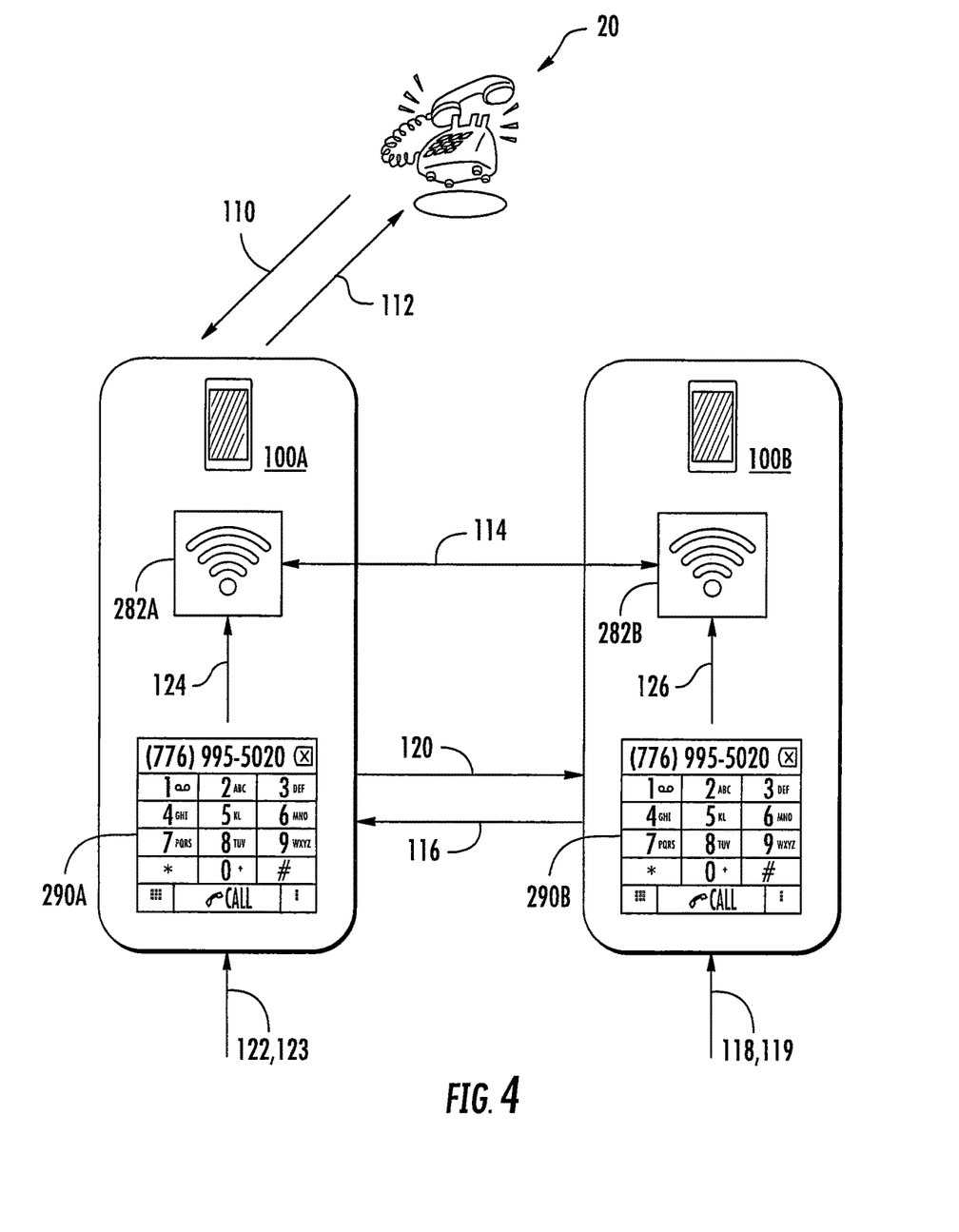
FIG. 4 is a diagram illustrating data transfer between an outside device, a host electronic device and a participant electronic device according to some embodiments.

FIG. 4 is a block diagram illustrating systems and methods according to some embodiments. The host electronic device 100A is configured to receive incoming call data 110 from the outside device 20 and to send outgoing call data 112 to the outside device 20. The incoming call data 110 and the outgoing call data 112 are associated with a telephone call (e.g., including audio, image and/or video data) with the outside device 20.

As illustrated, the host electronic device 100A includes a wireless communication module 282A that is configured to communicate with a wireless communication module 282B of the participant device 100B over a direct wireless interface 114. In some embodiments, one or both of the wireless communication modules 282A, 282B are configured to establish a Wi-Fi Direct wireless connection therebetween. In some embodiments, one or both of the wireless communication modules 282A, 282B are configured to establish a Bluetooth wireless connection therebetween. One or both of the wireless communication modules 282A, 282B may be configured to automatically establish a direct wireless connection therebetween.

The host electronic device 100A is configured to process and present the incoming call data 110 of the telephone call through a speaker and/or a display device at the host electronic device 100A. The host electronic device 100A may be configured to automatically process and present the incoming call data 110 of the telephone call through a speaker and/or a display device at the host electronic device 100A. The host electronic device 100A is configured to establish a direct wireless connection with the participant electronic device 100B (i.e., over the direct wireless interface 114). The host electronic device 100A may be configured to automatically establish a direct wireless connection with the participant electronic device 100B (i.e., over the direct wireless interface 114). The host electronic device 100A is configured to forward or send (e.g., automatically forward or send) the incoming call data 110 of the telephone call to the participant electronic device 100B using the direct wireless connection or interface 114 for presentation (e.g., playback) of the incoming call data 110 through a speaker and/or a display device at the participant electronic device 100B. In some embodiments, the host electronic device 100A is configured to concurrently or substantially concurrently process and present the incoming call data 110 at the host electronic device 100A and forward the incoming call data 110 to the participant electronic device 100B for presentation at the participant electronic device 100B. In some embodiments, the host electronic device 100A is configured to process and present the incoming call data 110 at the host electronic device 100A and forward the incoming call data 110 to the participant electronic device 100B for concurrent or substantially concurrent presentation at the participant electronic device 100B. The participant electronic device 100B may be configured to receive the incoming call data 110 and process and present the incoming call data 110 through a speaker and/or a display device at the participant electronic device 100B concurrently or substantially concurrently with the presentation at the host electronic device 100A. The participant electronic device 100B may be configured to automatically receive the incoming call data 110 and automatically process and present the incoming call data 110 through a speaker and/or a display device at the participant electronic device 100B concurrently or substantially concurrently with the presentation at the host electronic device 100A.

The host electronic device 100A is configured to receive participant call data 116 forwarded from the participant electronic device 100B. The host electronic device 100A may be configured to automatically receive participant call data 116 forwarded from the participant electronic device 100B. The participant call data 116 is received at the host electronic device 100A using the direct wireless connection or interface 114. The host electronic device 100A is configured to process and present the participant call data 116 through a speaker and/or a display device at the host electronic device 100A. The host electronic device 100A may be configured to automatically process and present the participant call data 116 through a speaker and/or a display device at the host electronic device 100A. The host electronic device 100A is configured to forward the participant call data 116 to the outside device 20 (e.g., for presentation or playback through a speaker and/or a display device at the outside device 20). The host electronic device 100A may be configured to automatically forward the participant call data 116 to the outside device 20 (e.g., for presentation or playback through a speaker and/or a display device at the outside device 20). In some embodiments, the host electronic device 100A is configured to concurrently or substantially concurrently process and present the participant call data 116 at the host electronic device 100A and forward the participant call data 116 to the outside device 20 for presentation at the outside device 20. In some embodiments, the host electronic device 100A is configured to process and present the participant call data 116 at the host electronic device 100A and forward the participant call data 116 to the outside device 20 for concurrent or substantially concurrent presentation at the outside device 20. The participant call data 116 may be based on audio 118 (e.g., speech) and/or video 119 captured at the participant electronic device 100B (e.g., using a microphone and/or a camera).

In some embodiments, the host electronic device 100A is configured to forward (e.g., automatically forward) host call data 120 to the participant electronic device 100B using the direct wireless interface 114 for presentation (e.g., playback) of the host call data 120 at the participant electronic device 100B (e.g., through a speaker and/or a display device at the participant electronic device 100B). The host call data 120 may be based on audio 122 (e.g., speech) and/or video 123 captured at the host electronic device 100A (e.g., using a microphone and/or a camera). In some embodiments, the host electronic device 100A is configured to concurrently or substantially concurrently forward (e.g., automatically forward) the host call data 120 to the outside device 20 and forward the host call data 120 to the participant electronic device 100B for presentation or playback at the participant electronic device 100B. In some embodiments, the host electronic device 100A is configured to forward the host call data 120 to the outside device 20 and forward the host call data 120 to the participant electronic device 100B for concurrent or substantially concurrent presentation or playback at the outside device 20 and the participant electronic device 100B. The participant electronic device 100B may be configured to receive the host call data 120 and process and present the host call data 120 through a speaker and/or a display device at the participant electronic device 100B concurrently or substantially concurrently with the presentation at the host electronic device 100A. The participant electronic device 100B may be configured to automatically receive the host call data 120 and automatically process and present the host call data 120 through a speaker and/or a display device at the participant electronic device 100B concurrently or substantially concurrently with the presentation at the host electronic device 100A.

Given this arrangement, it is seen that that participant electronic device 100B may be indirectly in a conference call with the outside device 20 (and possibly the host electronic device 100A, if participating) because the host electronic device 100A shares call data of the participant electronic device 100B with the outside device 20; the host electronic device 100A also shares call data of the outside device 20 with the participant electronic device 100B. The host electronic device 100A may serve as a proxy for the participant electronic device 100B to communicate with the outside device 20 (and/or to participate on the conference call with the outside device 20 and the host electronic device 100A). Also, as discussed above, the direct wireless interface 114 may facilitate a data pipe between the host electronic device 100A and the participant electronic device 100B without affecting or interrupting the call or communication between the outside device 20 and the host electronic device 100A.

In some embodiments, and as illustrated, the host electronic device 100A includes a phone application 290A. The phone application 290A may be configured to display the throw interface 104 (FIG. 3A) at a display of the host electronic device 100A. The phone application 290A may throw 124 (e.g., automatically forward or throw) the incoming call data 110 and/or the host call data 120 to the wireless communication module 282A which may in turn forward, send or stream (e.g., automatically forward, send or stream) the data to the wireless communication module 282B of the participant electronic device 100B. The wireless communication module 282B may forward 126 (e.g., automatically forward) the incoming call data 110 and/or the host call data 120 to a phone application 290B of the participant electronic device 100B. The phone application 290B may forward and/or send (e.g., automatically forward and/or send) the participant call data 116 to the wireless communication module 282B which may in turn forward or stream (e.g., automatically forward or stream) the data to the wireless communication module 282A of the host electronic device 100A. The call data may be forwarded, sent or streamed between the devices 100A, 100B in real time or substantially in real time to facilitate efficient telephone calls (e.g., conference calls).

Figure 5:
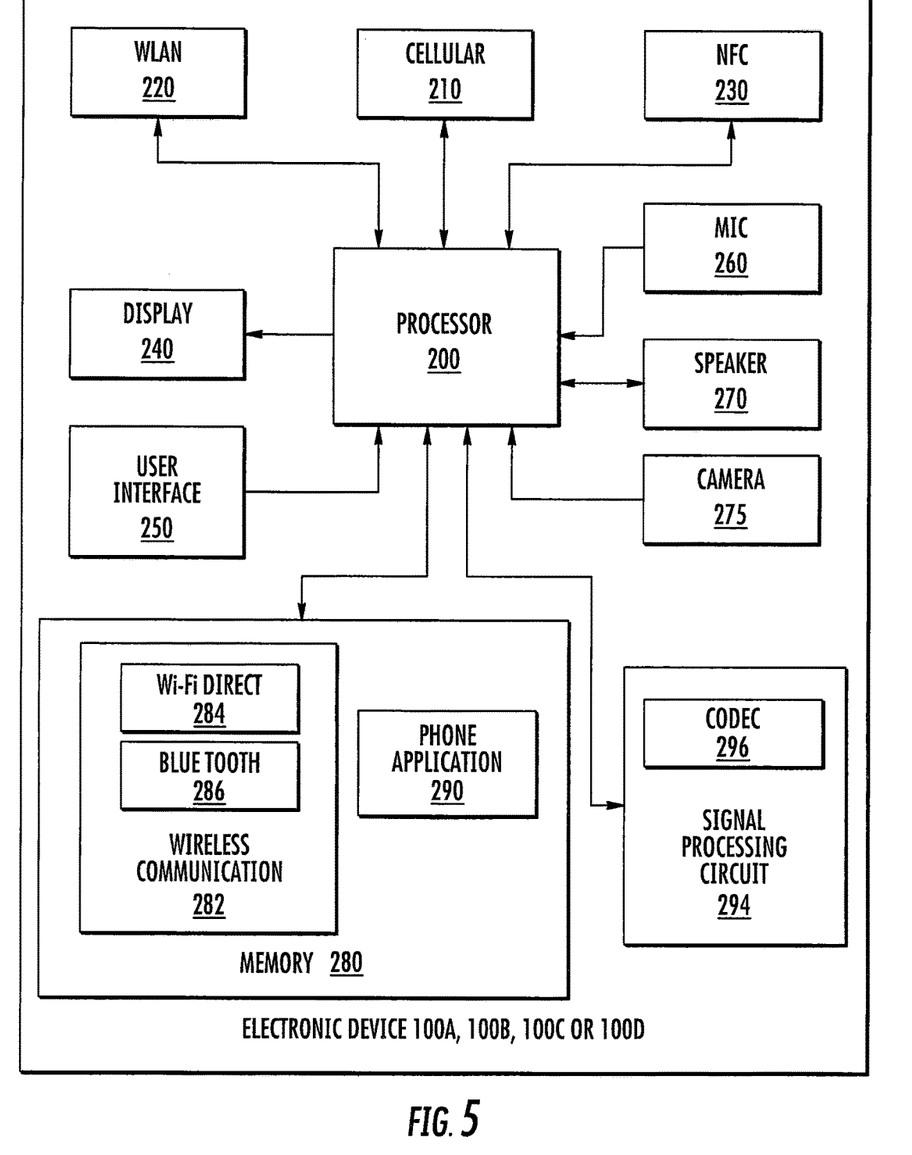
FIG. 5 is a schematic diagram illustrating a wireless communications terminal according to some embodiments.

FIG. 5 illustrates an electronic device 100A, 100B, 100C or 100D that may support the operations described above. It will be understood that some of the features shown in FIG. 5 may be omitted from one or more of the devices 100A, 100B, 100C, 100D. As shown, the electronic device includes a processor 200 (e.g., one more microprocessor and/or signal processor chips) configured to interoperate with a memory 280, which may be used to store executable code and data. The processor 200 may also be coupled to various communications circuits. For example, the processor 200 may be coupled to a cellular radio communications circuit 210 that provides connectivity to cellular networks, a wireless local area network (WLAN) communications circuit 220 that supports local wireless communications (e.g., compliant with one or more of the IEEE 801.11a-n standards) and a near-field communications (NFC) circuit 230, which supports close range communications with other terminals or devices. The electronic device may also include user interface components that interoperate with the processor 200, such as a display 240, a keypad 250, a microphone 260, a speaker 270 and a camera 275. The microphone 260 may be used to capture audio or speech at the electronic device. The speaker 270 may output, playback or present audio or speech at the electronic device. The camera 275 may capture images or video at the electronic device. The display 240 may output, playback or present images or video at the electronic device. For example, the controller 210 and the speaker 270 of the host electronic device 100A may be configured to execute playback of speech associated with the incoming call data 110 and/or to execute playback of speech associated with the participant call data 116. The controller 210 and the speaker 270 of the participant electronic device 100B may be configured to execute playback of speech associated with the incoming call data 110 and/or the host call data 120.

The processor 200 and memory 280 may be configured to store and execute computer code that causes the electronic device to perform operations described above with reference to FIGS. 1-4. For example, the memory 280 may include executable code and data in the form of a wireless communication module 282 configured to support direct wireless communication operations as described above including discovering and pairing devices, establishing a direct wireless communication interface between devices and sending/receiving (e.g., streaming) audio or speech data or signals between the devices over the direct wireless communication interface. The memory 280 may include executable code and data 284 to support operations using Wi-Fi Direct as the direct wireless interface and/or may include executable code and data 286 to support operations using Bluetooth as the direct wireless interface. The memory 280 may include executable code and data in the form of a phone application 290 that includes the throw interface 104 (FIG. 3A) that is used to "throw" the call associated with the outside device 20 from the host electronic device 100A to one or more of the participant electronic devices 100B, 100C, 100D, as discussed above. The throw button may also be used by one of the participant devices 100B, 100C, 100D to ping or ring the host device 100A, as discussed below.

The electronic device may also include an audio/video signal processing circuit 294. The audio/video signal processing circuit 294 may be configured to process or transcode audio or video data or signals, for example before the data is sent to another device or before presentation or playback (e.g., through a speaker or a display device). The audio signal processing circuit 294 may include a codec 296 configured to perform processing or transcoding operations (e.g., decoding and encoding) on any of the call data.

Figure 6A:
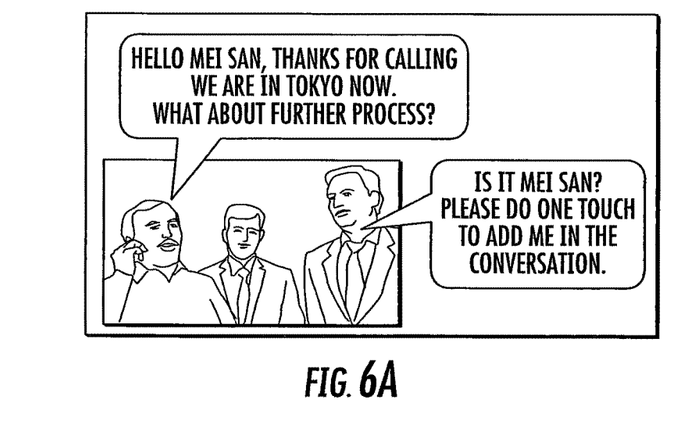
FIGS. 6A-6D illustrate scenarios in which embodiments of the invention may be useful.
Figure 6B:
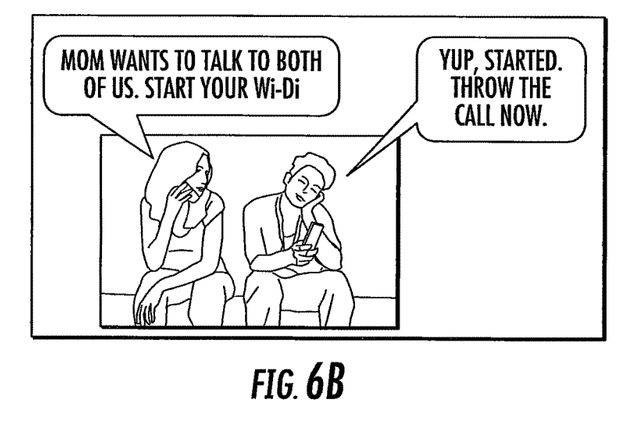

Devices, systems and methods according to some embodiments may be advantageously employed in a number of scenarios, some of which are illustrated in FIGS. 6A-6D. In FIGS. 6A and 6B, a user of a host electronic device (e.g., a mobile telephone) receives a call from an outside caller, and it is desired to add a user of a participant electronic device (e.g., a mobile telephone) to the conversation. In FIG. 6A, a direct wireless connection between the host and participant electronic devices can be established using NFC (e.g., Sony One-Touch). In FIG. 6B, the user of the participant electronic device may activate or start her Wi-Fi Direct ("Wi-Di") connectivity and the user of the host electronic device may then "throw" the call to user of the participant electronic device.

Figure 6C:
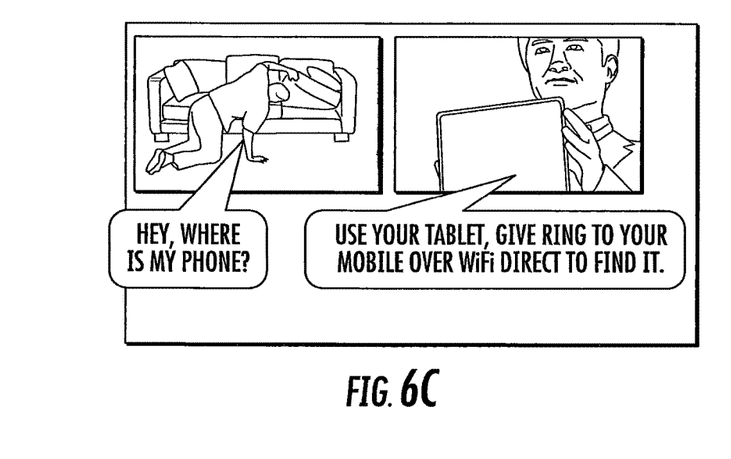

Turning to FIG. 6C, a user of a host electronic device (e.g., a mobile telephone) having a subscriber identity module (SIM) card can sometimes misplace the device. In known systems, the host device may be the only way for the user to place or receive a telephone call and the user must search for the lost device before doing so. According to some embodiments, the user may use a participant device (e.g., a tablet computer) and connect with the host device using Wi-Fi Direct (or Bluetooth). The user may then use the participant device to place or receive a telephone call (using the host device as a proxy). Also, in some embodiments, the user may press the "throw" button of the participant device to ping and/or ring the host device to help locate the host device. These operations can be achieved with persistent group setup for Wi-Fi Direct.

Figure 6D:
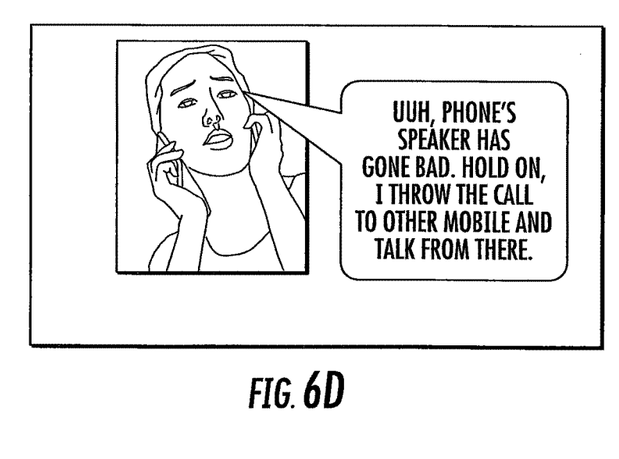

As illustrated in FIG. 6D, it may be desirable to switch devices during a telephone call. For example, a hardware component (e.g., microphone, speaker) may be malfunctioning or the battery could be losing its charge. The user may throw the call to another device according to some embodiments. In another situation, the user may have a tablet computer or the like with a SIM card, but may find it difficult to talk on the tablet computer. The user may throw the call to a mobile telephone or other device that is more suitable for a telephone call, even if that device does not have a SIM card. That is, the device with the SIM card can act as a proxy such that the second device can be used for the telephone call.

Figure 7:
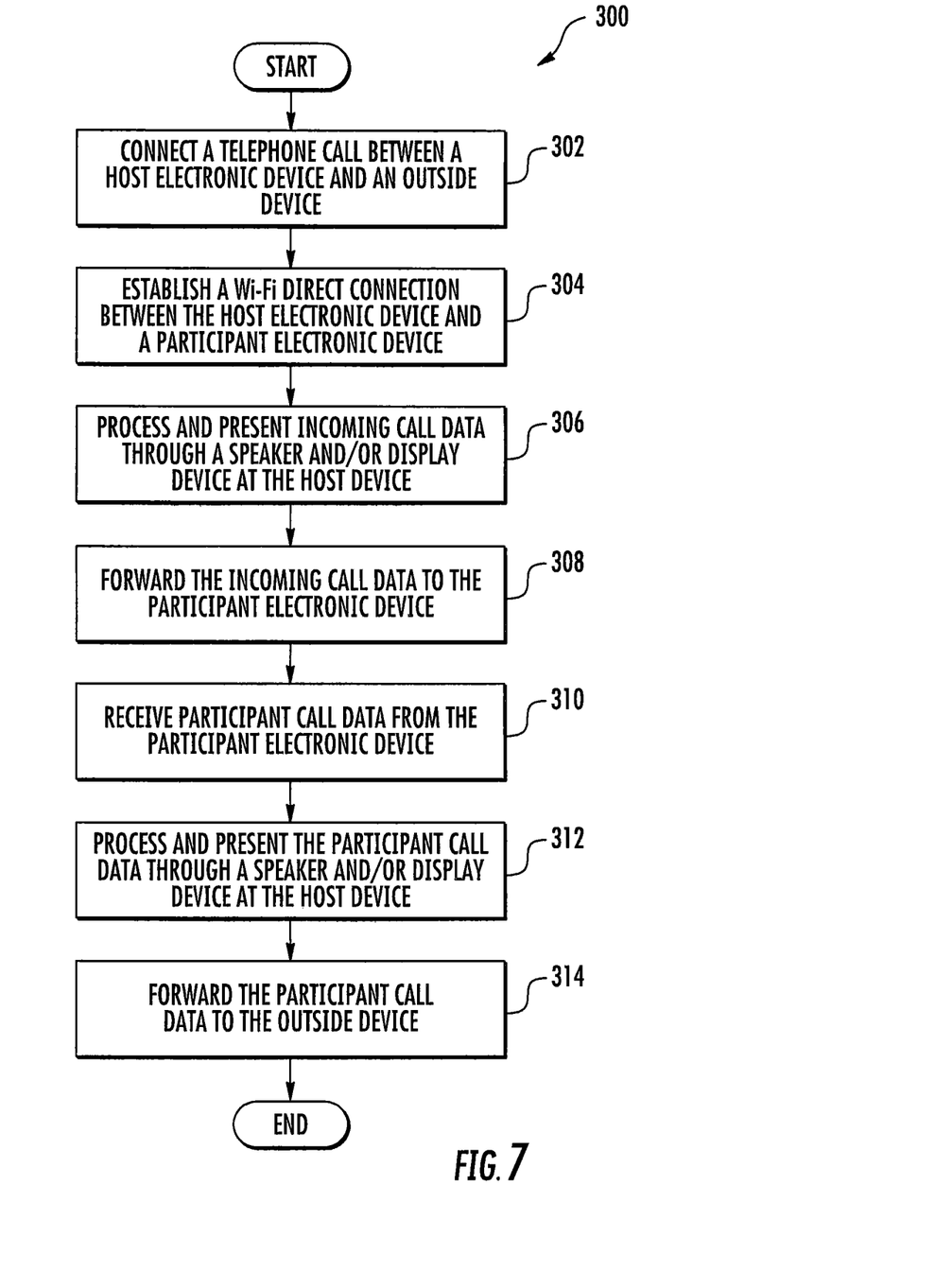
FIG. 7 is a flowchart of methods and operations that may be carried out using by the host device of FIG. 2.

Exemplary operations according to some embodiments are illustrated in FIG. 7. Referring to FIG. 7, a method 300 using a Wi-Fi compliant host electronic device (e.g., the device 100A) is illustrated. The method includes connecting a telephone call between the host electronic device 100A and an outside device 20 (Block 302). The telephone call may include incoming call data 110 received at the host electronic device 100A from the outside device 20 and outgoing call data 112 sent by the host electronic device 100A to the outside device 20. A Wi-Fi Direct wireless connection is established between the host electronic device 100A and a participant electronic device (e.g., the device 100B) that is in a Wi-Fi Direct network 102 with the host electronic device 100A (Block 304). The incoming call data 110 is processed and presented through a speaker 270 and/or display device 240 at the host electronic device 100A (Block 306). The incoming call data 110 is forwarded to the participant electronic device 100B using the Wi-Fi Direct wireless connection for presentation of the incoming call data 110 through a speaker 270 and/or a display device 240 at the participant device 100B (Block 308). Participant call data 116 from the participant electronic device 110B is received at the host electronic device 100A using the Wi-Fi Direct wireless connection (Block 310). The participant call data 116 is processed and presented at the host electronic device 100A through a speaker 270 and/or display device 240 at the host electronic device 100A (Block 312). The participant call data 116 is forwarded to the outside device 20 (Block 314).

It will be appreciated that additional operations are contemplated, including those described above in connection with the described devices and components.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substan- That which is claimed is:

1. A host electronic device configured to share a telephone call with a participant electronic device, the host electronic device comprising:
   a transceiver configured to:
      receive incoming call data of the telephone call from an outside device; and
      send outgoing call data of the telephone call to the outside device;
   a wireless communication module configured to communicate with the participant electronic device over a direct wireless interface;
   a display device, wherein the host electronic device is configured to operate in a discovery mode; and
   a controller configured to:
      display a throw interface on the display device;
      display a list of available participant electronic devices on the display device responsive to user actuation of the throw interface;
      responsive to user input selecting one of the available participant electronic devices, establish a direct wireless connection with the participant electronic device, wherein the direct wireless connection is a Wi-Fi Direct wireless connection with the selected one of the available participant electronic devices;
      process and present the incoming call data through a speaker and/or the display device at the host electronic device;
      forward the incoming call data to the participant electronic device using the direct wireless connection for presentation of the incoming call data through a speaker and/or a display device at the participant electronic device;
      receive participant call data from the participant electronic device using the direct wireless connection;
      process and present the received participant call data through the speaker and/or the display device at the host electronic device; and
      forward the participant call data to the outside device;
   wherein the host electronic device is configured to communicate with other electronic devices via near-field communication (NFC), and wherein the controller is configured to establish the Wi-Fi Direct wireless connection with the participant electronic device using information exchanged when the host electronic device and the participant electronic device are touched or brought in proximity with one another;
   wherein the host electronic device is configured to store network credentials to subsequently reinstate the Wi-Fi Direct wireless connection with the participant electronic device; and
   wherein the host electronic device is configured to automatically reinstate the Wi-Fi Direct wireless connection with the participant electronic device using the network credentials that are stored.

2. The device of claim 1, wherein the controller is configured to substantially concurrently: (i) process and present the incoming call data through the speaker and/or the display device at the host electronic device; and (ii) forward the incoming call data to the participant electronic device using the direct wireless connection for presentation of the incoming call data through the speaker and/or the display device at the participant electronic device.

3. The device of claim 1, wherein the controller is configured to substantially concurrently: (i) process and present the participant call data at the host electronic device through the speaker and/or the display device at the host electronic device; and (ii) forward the participant call data to the outside device.

4. The device of claim 1, wherein the participant call data is based on audio and/or video captured at the participant electronic device.

5. The device of claim 1, further comprising a microphone configured to capture audio at the host electronic device and/or a camera configured to capture video at the host electronic device, wherein the controller is configured to forward host call data to the participant electronic device using the direct wireless connection for presentation of the host call data through the speaker and/or the display device at the participant electronic device, wherein the host call data is based on the audio and/or video captured at the host electronic device.

6. The device of claim 5, wherein the controller is configured to substantially concurrently: (i) forward the host call data to the outside device; and (ii) forward the host call data to the participant electronic device using the direct wireless connection for presentation of the host call data through the speaker and/or the display device at the participant electronic device.

7. The device of claim 1, wherein the host electronic device is configured to operate in a communication mode after the Wi-Fi Direct wireless connection with the selected one of the available participant electronic devices is established.

8. The device of claim 1, wherein the controller is configured to:
   automatically process and present the incoming call data through the speaker and/or the display device at the host electronic device;
   automatically forward the incoming call data to the participant electronic device using the direct wireless connection for presentation of the incoming call data through the speaker and/or the display device at the participant electronic device;
   automatically receive participant call data from the participant electronic device using the direct wireless connection;
   automatically process and present the received participant call data through the speaker and/or the display device at the host electronic device; and
   automatically forward the participant call data to the outside device.

9. A method using a host electronic device compliant with Wi-Fi Direct, the method comprising:
   connecting a telephone call between the host electronic device and an outside device including receiving incoming call data from the outside device, wherein the incoming call data is based on audio and video captured at the outside device;
   before establishing a Wi-Fi Direct wireless connection, operating the host electronic device in a discovery mode comprising searching for available participant electronic devices, in response to effecting a throw command at the host electronic device;
   establishing the Wi-Fi Direct wireless connection between the host electronic device and a participant electronic device that is in a Wi-Fi Direct network with the host electronic device;

processing and presenting the incoming call data through a speaker and a display device at the host electronic device;
forwarding the incoming call data to the participant electronic device using the Wi-Fi Direct wireless connection for presentation of the incoming call data through a speaker and a display device at the participant electronic device;
receiving participant call data from the participant electronic device using the Wi-Fi Direct wireless connection, wherein the participant call data is based on audio and video captured at the participant electronic device;
processing and presenting the participant call data at the host electronic device through the speaker and the display device at the host electronic device;
forwarding the participant call data to the outside device;
capturing audio and video at the host electronic device; and
forwarding host call data to the participant electronic device using the Wi-Fi Direct wireless connection for presentation of the host call data through the speaker and the display device at the participant electronic device, wherein the host call data is based on the audio and video captured at the host electronic device.

10. The method of claim 9, comprising forwarding the incoming call data to the participant electronic device using the Wi-Fi Direct wireless connection for presentation of the incoming call data through the speaker and the display device at the participant electronic device that is substantially concurrent with the presentation of the incoming call data through the speaker and the display device at the host electronic device.

11. The method of claim 9, comprising forwarding the participant call data to the outside device for presentation of the participant call data through a speaker and a display device of the outside device that is substantially concurrent with the presentation of the of the participant call data at the host electronic device through the speaker and/or the display device at the host electronic device.

12. The method of claim 9, further comprising forwarding the host call data to the outside device for presentation of the host call data through a speaker and a display device of the outside device that is substantially concurrent with the presentation of the host call data through the speaker and the display device at the participant electronic device.

13. The method of claim 9, further comprising:
displaying a list of the available participant electronic devices in the Wi-Fi network on the display device of the host electronic device in response to the throw command; and
selecting at least one of the displayed available participant electronic devices.

14. The method of claim 13, comprising:
selecting a plurality of the displayed available participant electronic devices;
establishing a Wi-Fi Direct wireless connection between the host electronic device and each of the plurality of selected participant electronic devices;
forwarding the incoming call data to each of the plurality of selected participant electronic devices using the Wi-Fi Direct wireless connection for presentation of the incoming call data through a speaker and a display device at each of the plurality of selected participant electronic devices;
receiving participant call data from each of the plurality of selected participant electronic devices using the Wi-Fi Direct wireless connection;
processing and presenting the participant call data from each of the plurality of selected participant electronic devices at the host electronic device through the speaker and the display device at the host electronic device; and
forwarding the participant call data from each of the plurality of selected participant electronic devices to the outside device.

15. The method of claim 9, further comprising, prior to establishing a Wi-Fi Direct wireless connection, touching and/or bringing the host electronic device and the participant electronic device in proximity with one another to communicate using NFC and share information to establish the Wi-Fi Direct wireless connection.

16. The method of claim 9, comprising:
automatically processing and presenting the incoming call data through the speaker and the display device at the host electronic device;
automatically forwarding the incoming call data to the participant electronic device using the Wi-Fi Direct wireless connection for presentation of the incoming call data through the speaker and the display device at the participant electronic device;
automatically receiving participant call data from the participant electronic device using the Wi-Fi Direct wireless connection;
automatically processing and presenting the participant call data at the host electronic device through the speaker and the display device at the host electronic device; and
automatically forwarding the participant call data to the outside device.

17. A system comprising:
a host electronic device in a Wi-Fi Direct network, the host electronic device configured to connect with an outside device for a telephone call including incoming call data;
at least one participant electronic device in the Wi-Fi Direct network;
wherein the host electronic device is configured to:
operate in a discovery mode;
display a throw interface on a display device of the host electronic device;
display a list of available participant electronic devices on the display device responsive to user actuation of the throw interface; and
responsive to user input selecting one of the available participant electronic devices from the list, establish a Wi-Fi Direct wireless connection with the selected participant electronic device, wherein the at least one participant electronic device comprises the selected participant electronic device;
automatically process and present the incoming call data through a speaker and/or the display device; and
substantially concurrently forward over the Wi-Fi Direct connection the incoming call data to the at least one participant electronic device;
wherein the at least one participant electronic device is configured to:
automatically process and present the incoming call data received from the host electronic device through a speaker and/or a display device substantially concurrently with the presentation of the incoming call data through the speaker and/or the display device at the host electronic device;
automatically forward participant call data to the host electronic device over the Wi-Fi Direct connection, wherein the participant call data is based on audio and/or video captured at the at least one participant electronic device;

wherein at least one of the host electronic device and the at least one participant electronic device is configured to:

store network credentials to subsequently reinstate the Wi-Fi Direct connection; and automatically reinstate the Wi-Fi Direct connection using the network credentials that are stored.

18. The system of claim 17, wherein the at least one participant electronic device comprises a controller and a display, wherein the at least one participant electronic device is configured to display an actuatable throw interface, wherein the at least one participant electronic device is configured to establish a Wi-Fi Direct connection with the host electronic device upon user actuation of the throw interface.

19. The system of claim 18, wherein the at least one participant electronic device is configured to receive a call from the outside device after establishing the Wi-Fi Direct connection with the host electronic device, wherein the host electronic device serves as a proxy device for the call.

20. The system of claim 19, wherein the host electronic device is configured to emit an audible and/or visible alert upon actuation of the throw interface at the at least one participant electronic device.

21. The method of claim 9, further comprising:

storing network credentials to subsequently reinstate the Wi-Fi Direct wireless connection with the participant electronic device; and automatically reinstating the Wi-Fi Direct wireless connection with the participant electronic device using the network credentials that are stored.

22. The system of claim 17, wherein the at least one participant electronic device is configured to ring the host electronic device via the Wi-Fi Direct connection.

* * * * *